United States Patent
Rinklin

(10) Patent No.: US 6,666,488 B2
(45) Date of Patent: Dec. 23, 2003

(54) BUMPER SYSTEM FOR A VEHICLE AND A METHOD OF MAKING SAME

(75) Inventor: Gerhard Rinklin, Tiefenbronn (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/076,397

(22) Filed: Feb. 19, 2002

(65) Prior Publication Data

US 2002/0113446 A1 Aug. 22, 2002

(30) Foreign Application Priority Data

Feb. 16, 2001 (DE) ......................................... 101 07 287

(51) Int. Cl.⁷ ............................................... B60R 19/02
(52) U.S. Cl. ....................................................... 293/120
(58) Field of Search ................................ 293/120, 102, 293/103, 132, 133, 135, 136, 121, 142

(56) References Cited

U.S. PATENT DOCUMENTS

| | | | |
|---|---|---|---|
| 3,795,419 A | * | 3/1974 | Niemkiewicz et al. |
| 3,926,463 A | | 12/1975 | Landwehr et al. |
| 4,904,008 A | * | 2/1990 | Glance ........................ 293/120 |
| 4,929,008 A | * | 5/1990 | Esfandiary .................. 293/120 |
| 4,971,376 A | * | 11/1990 | Eipper et al. ................ 293/132 |
| 5,306,056 A | | 4/1994 | Vogelgesang |
| 5,984,390 A | * | 11/1999 | Kemp et al. ................ 293/132 |
| 6,199,937 B1 | * | 3/2001 | Zetouna et al. ............. 293/136 |
| 6,322,115 B1 | * | 11/2001 | Devilliers .................... 293/142 |
| 2002/0125725 A1 | * | 9/2002 | Satou .......................... 293/132 |
| 2002/0167183 A1 | * | 11/2002 | Shimotsu et al. ........... 293/132 |
| 2002/0180223 A1 | * | 12/2002 | Vismara et al. ............. 293/120 |

FOREIGN PATENT DOCUMENTS

| | | | |
|---|---|---|---|
| DE | 28 38 572 | | 3/1980 |
| DE | 3622483 | | 3/1989 |
| DE | 38 20 101 | | 12/1989 |
| DE | 42 01 839 | | 9/1998 |
| DE | 298 11 815 | | 10/1998 |
| DE | 199 22 847 | | 11/2000 |
| EP | 0050205 | | 4/1984 |
| GB | 2033535 | * | 5/1980 |
| JP | 58-211942 | * | 12/1983 | .................. 293/102 |
| JP | 6-40298 | * | 2/1994 | .................. 293/135 |
| JP | 6-247340 | * | 9/1994 | .................. 293/142 |

OTHER PUBLICATIONS

Copy of search report.

* cited by examiner

Primary Examiner—Joseph D. Pape
Assistant Examiner—H. Gutman
(74) Attorney, Agent, or Firm—Crowell & Moring LLP

(57) ABSTRACT

A bumper system for a vehicle, in particular a car, with a bumper support and a trim component is provided, wherein the bumper support has an attachment element for at least one impact horn projecting past the outer surface of the trim component and the trim component has at least one opening for the impact horn. To reduce the production and storage costs for different bumper systems, a covering component that can be inserted into the opening is provided.

41 Claims, 4 Drawing Sheets

BUMPER SYSTEM FOR A VEHICLE AND A METHOD OF MAKING SAME

BACKGROUND AND SUMMARY OF THE INVENTION

This application claims the priority of German Patent Document DE 101 07 287.2, filed Feb. 16, 2001.

The invention concerns a bumper system for a vehicle comprising a bumper support and a trim component, wherein the bumper support has an attachment means for at least one impact horn projecting past an outer surface of the trim component and the trim component has at least one opening for the impact horn.

A bumper system for a vehicle of this kind is known from German Patent Document DE 28 38 572. It has a bumper support to which are attached impact horns, in particular by screwing. The bumper support, which is made of a high-strength and rigid material, is covered by a trim component, which is a component of the chassis outer layer. The trim component has two openings spaced a certain distance from one another, through which the impact horns pass and in this way project past the chassis outer layer.

In German Patent Document 42 01 839, and corresponding U.S. Pat. No. 5,306,056, a bumper system with a bumper support is described wherein the impact horns are molded onto the bumper support by material forming and in this way are produced as one piece therewith. This bumper system includes in addition a trim component that covers the bumper and the impact horns.

An aspect of the invention is to create a bumper system of the type mentioned above, wherein for different design variants the stocking of parts and the production costs can nevertheless be reduced.

This aspect is attained with a bumper system which includes a bumper support and a trim component, wherein the bumper support has an attachment means for at least one impact horn projecting past an outer surface of the trim component and the trim component has at least one opening for the impact horn, and wherein a covering component can be inserted into the opening. Other features that configure the invention are disclosed in certain preferred embodiments.

The main advantages obtained with certain preferred embodiments of the invention are seen in particular in that only one trim component according to one design variant has to be provided for vehicles, whether they are to be equipped with or without impact horns. If a vehicle is equipped with impact horns, then—in a further development of the invention—a covering component must be inserted in the opening, which has an impact horn trim contour that is adapted to the impact horn. If a vehicle is produced without impact horns, a covering component, which is configured approximately flush with the shape of the outer surface of the trim component, can be inserted in the trim component. This creates a closed chassis outer layer having a uniform appearance in the area of the trim component. The at least one opening in the trim component, which is preferably made of plastic, can be recessed even during its production in the injection molding process. It can, however, also be introduced later into the trim component via a known punching, milling, or cutting process. In this way, depending on the needed number of bumper variants, trim components can already be available with or without an opening. In this way it is possible for the most varied requirements, be it for the purpose of complying with laws specific to a particular country or because of logistical, functional, and/or optical requirements, to have ready the appropriate bumper system from the already supplied components, trim component and covering component, with or without impact horn trim contour.

Other objects, advantages and novel features of the present invention will become apparent from the following detailed description of the invention when considered in conjunction with the accompanying drawings.

DETAILED DESCRIPTION OF THE DRAWINGS

Figure 1:
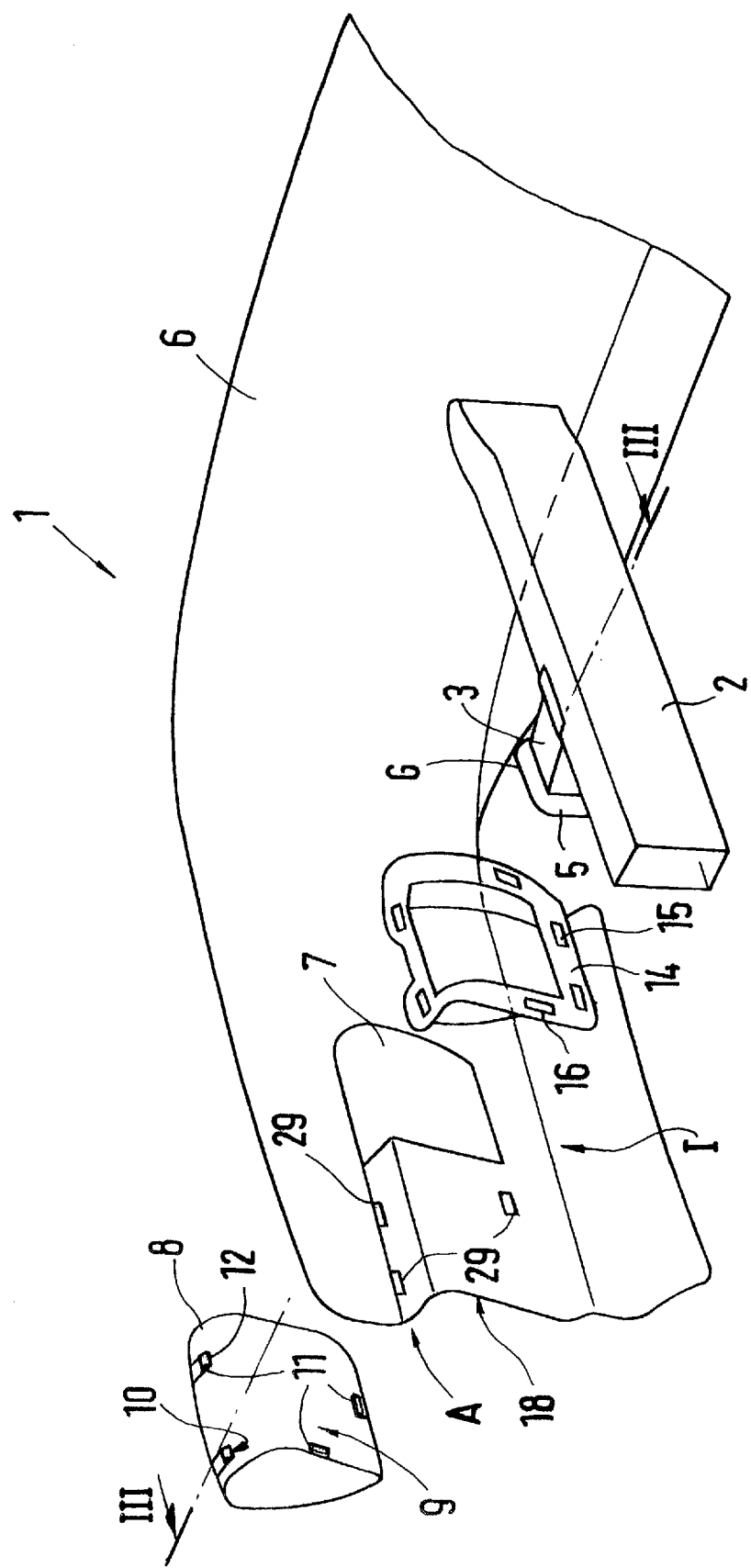
FIG. 1 shows a partial inner view of a first exemplary embodiment of a bumper system in exploded view.

Bumper system 1 shown in FIG. 1 includes a bumper support 2, which is made of a rigid material. Bumper support 2 can be attached to chassis members of a frame structure or underbody structure of a motor vehicle, in particular a passenger car. Impact horns 3 can be mounted on the bumper support, wherein detachable fasteners, such as screw connections, rivet joints (FIG. 4) or the like, are preferably used for this purpose. Non-detachable connections, such as a welded joint or a positive-lock joint, are also conceivable.

Figure 2:
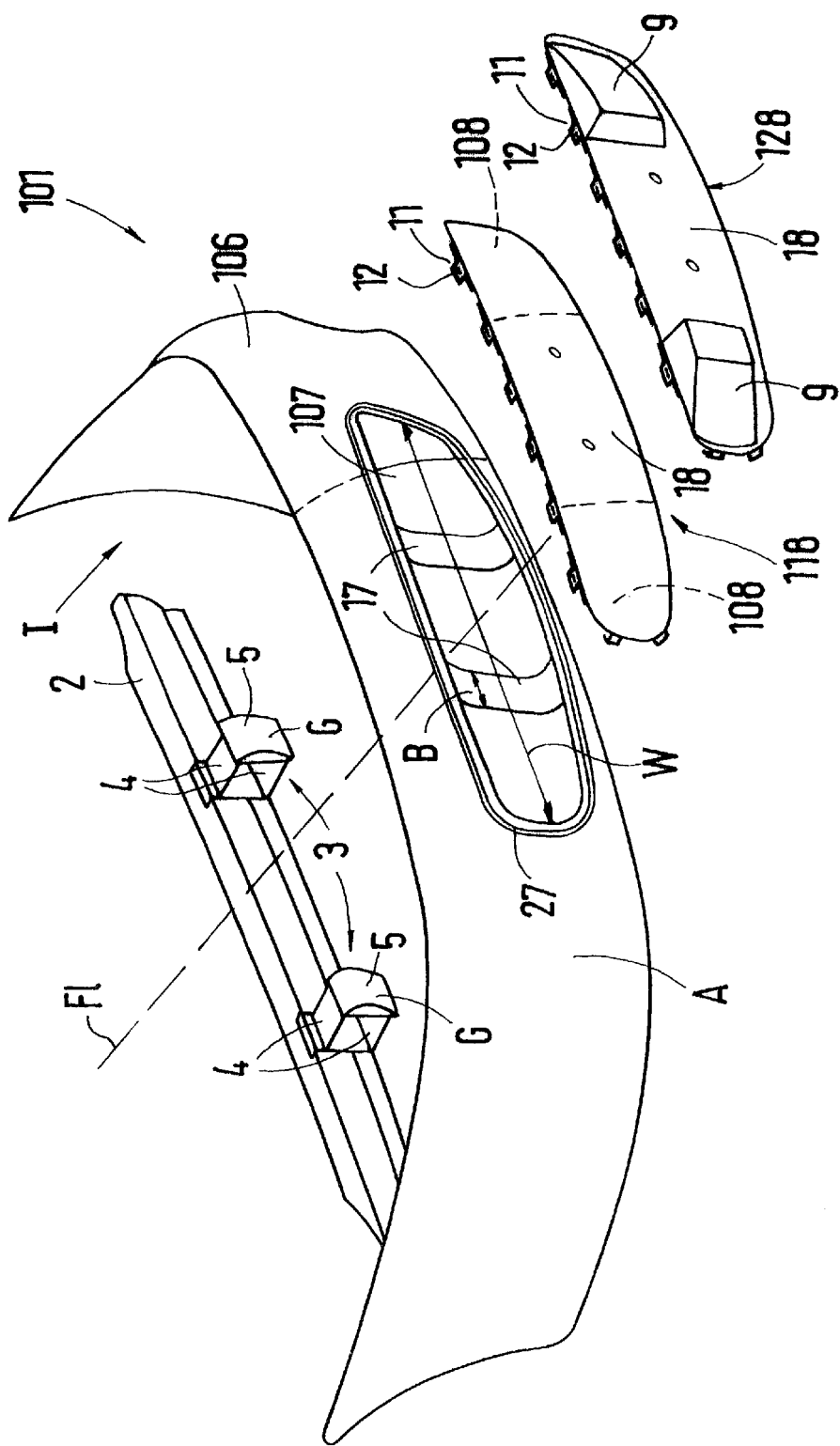
FIG. 2 shows a second exemplary embodiment of a bumper system in exploded view.

The impact horns 3 are arranged—seen transversely to the vehicle longitudinal axis F1—spaced a certain distance from one another on the bumper support 2, as is shown in particular in FIG. 2. According to FIG. 3, the impact horns 3 have a support element 4 that can be connected to the bumper support 2. At the end facing away from the bumper support, the support element has an impact element 5, which can be made of an elastically and/or plastically moldable material. For example, a rubber bumper G or the like can be provided for this purpose. However, it is also possible to use a hollow structure H (FIGS. 4 and 5) such as impact element 5, which can be arranged on support element 4. Hollow structure H can be elastically and/or plastically moldable. According to an alternative embodiment, however, also a plastically and/or elastically moldable honeycomb structure can be provided for the impact element.

Bumper system 1 also has, in addition to bumper support 2, a trim component 6 that can be a component of a chassis outer layer of the motor vehicle, which is not shown herein in more detail. Trim component 6 can be a tail or front trim component of the motor vehicle. Trim component 6 and bumper support 2 are preferably configured symmetrically with respect to the vehicle longitudinal axis F1.

Only one half of the bumper system is shown in FIG. 1. However, the half that is not visible therein is, as a rule, configured symmetrically with respect to the half that is shown. Trim component 6 has two openings spaced a certain distance apart, of which only one opening 7 can be seen. In bumper system 1 mounted on the vehicle, impact horn 3 engages through opening 7 and therefore projects past the chassis outer layer, that is, past outer surface A of trim component 6. To cover at least impact element 5, a covering component 8 can be installed in opening 7, which has an impact horn trim contour 9 adapted to impact horn 3 or to impact element 5 and is formed by a camber projecting outwardly, i.e. past the vehicle outer layer, also called a press-out.

A latch or clip connection 10 is provided for the attachment of covering component 8 to trim component 6. Covering component 8 is detachably connected to trim component 6. Latch or clip connection 10 comprises at least one lobe 11, which branches off covering component 8 and has a latching nose 12 that can engage behind trim component 6, in particular a projection 13 (FIG. 6) or a stepped recess formed thereon. As can be seen in FIG. 1, however, a retaining frame 14, which rims opening 7 and comes to rest against the inner side of trim component 6, can be provided that enables a kind of clamping attachment of covering component 8 on trim component 6. Retaining frame 14 has a retaining element 15 for lobe 11. Retaining element 15 is realized in particular as a retaining opening 16, through which the lobe 11 engages. The latching nose 12 engages behind retaining element 15 of retaining frame 14, whereby an optimal and fixed seat as well as an improved, if necessary also multiple, mounting or dismounting of the covering component 8 can be achieved.

If no impact horn is used in the bumper system 1 according to FIG. 1, another covering component can preferably be used instead of covering component 8 with impact horn trim contour 9, which has an outer contour configured flush with outer surface A of trim component 6, that is, adapted to the shape of outer surface A, so that essentially no transition can be seen between trim component 6 and the covering component. An essentially planar covering component 108 like this is drawn into FIG. 2 with broken lines on a covering component 118, wherein this covering component 118 is provided for an opening 107 in a trim component 106, which has an opening width W that is such that both impact horns 3 pass through this opening 107.

This trim component 106 has—as mentioned—only one, preferably approximately oval, opening 107 with an opening width W, which—to increase the stability of the trim component 106—can preferably be bridged, however, by a reinforcement bridge 17 that runs transversely to the opening width W on the inner side I of trim component 106, whose breadth B is considerably smaller than the opening width W of the opening 107.

If impact horns 3 are provided for bumper system 101 (FIG. 2), a covering component 128 that can be inserted into opening 107 is used. This covering component 128 has, like covering component 108 or 118, at least one lobe 11 with a latching nose 12 that engages behind the trim component 106 to hold covering component 128 in opening 107. Covering component 128 has two impact horn trim contours 9 that are configured as an outwardly directed camber and which cover impact elements 5. If no impact horns 3 are provided, covering component 118, visible in FIG. 2, is inserted in opening 107, which has an outer contour that follows approximately flush the outer surface A of trim component 106. An identification field 18 can be provided on coverings 118 and 128 as well as on trim component 6, which is arranged in particular between impact elements 5.

Figure 3:
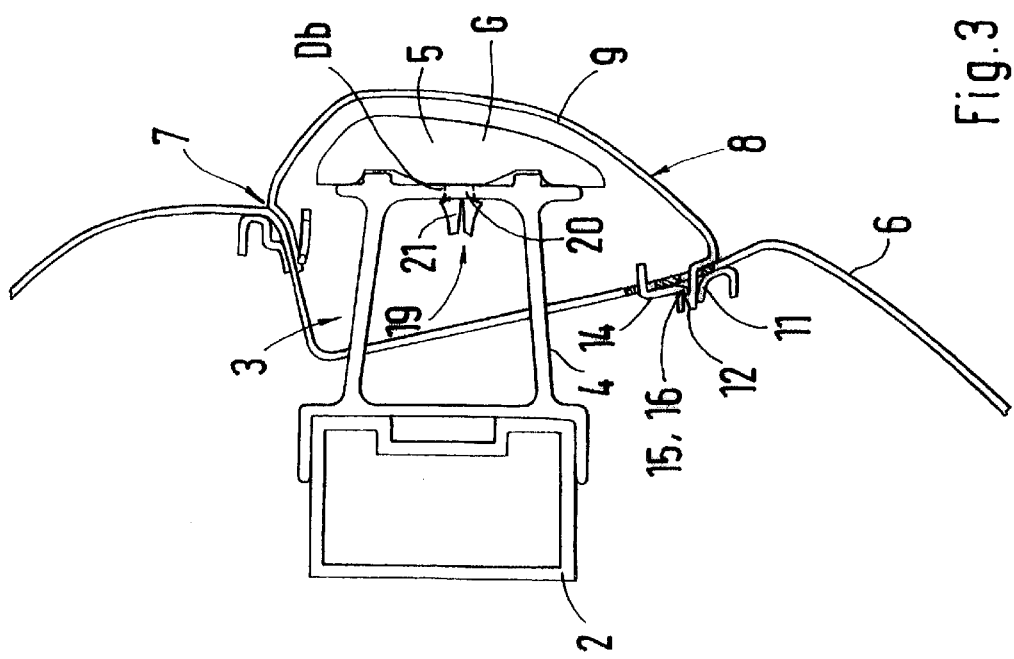
FIG. 3 shows the bumper system in a section along line III—III of FIG. 1.

In FIG. 3 it is also evident that impact element 5 can be mounted with an attachment clip 19 on support element 4. This attachment clip 19 having a shank 20 and a slotted thickening 21 at the end is inserted through opening Db in support element 4. The thickening 21 has in its slotted area an outer diameter that is greater than the inner diameter of the opening. The attachment or clipping of impact element 5 can also be achieved in another manner.

Figure 4:
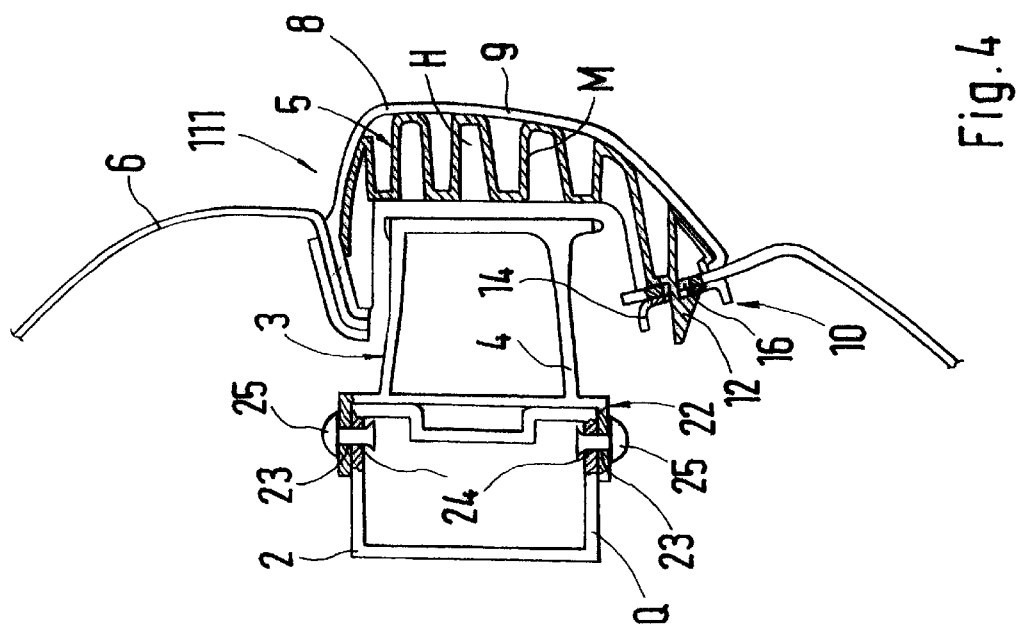
FIG. 4 shows another exemplary embodiment of the bumper system.
Figure 5:
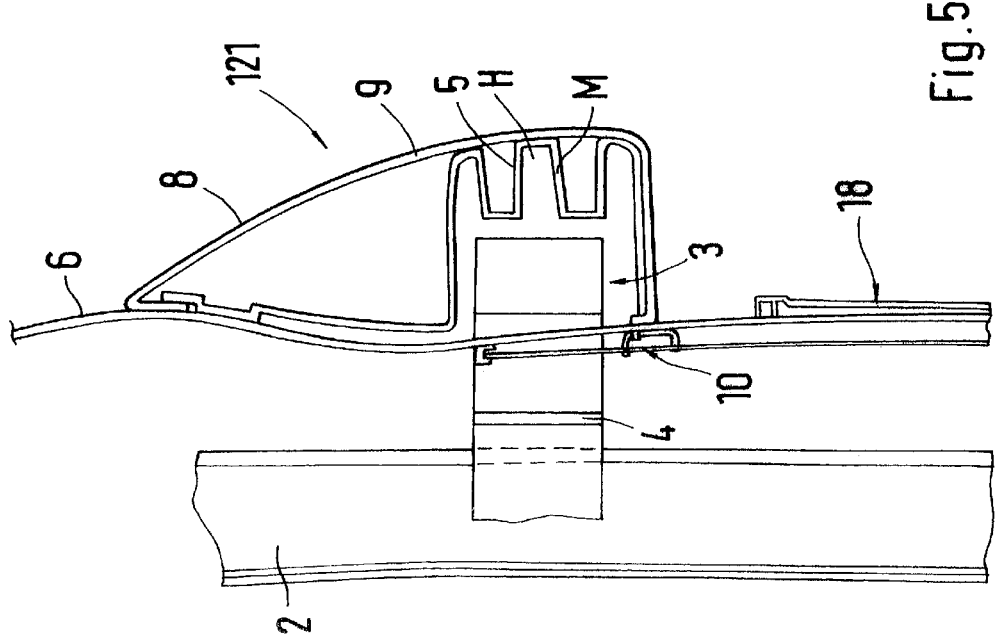
FIG. 5 shows a top view of yet another exemplary embodiment of the bumper system.

The exemplary embodiments of a bumper system 111 or 121 shown in FIGS. 4 and 5 have an impact element 5 formed by hollow structure H, which can be realized as a meander shaped structure M. The intersection plane in FIG. 4 lies parallel to the vertical. However, meander-shaped structure M can also extend parallel to a horizontal plane, as shown in FIG. 5, in which the intersection plane runs parallel to this horizontal plane. The covering component can be attached to hollow structure H, which lies behind covering component 8, 108, 118, or 128. Hollow structure H and the covering component can then be held by way of clip connection 10 on trim component 6 or 106. Hollow structure H can be attached on support element 4 and/or be arranged as an insertion and attachment component under covering component 8.

Figure 6:
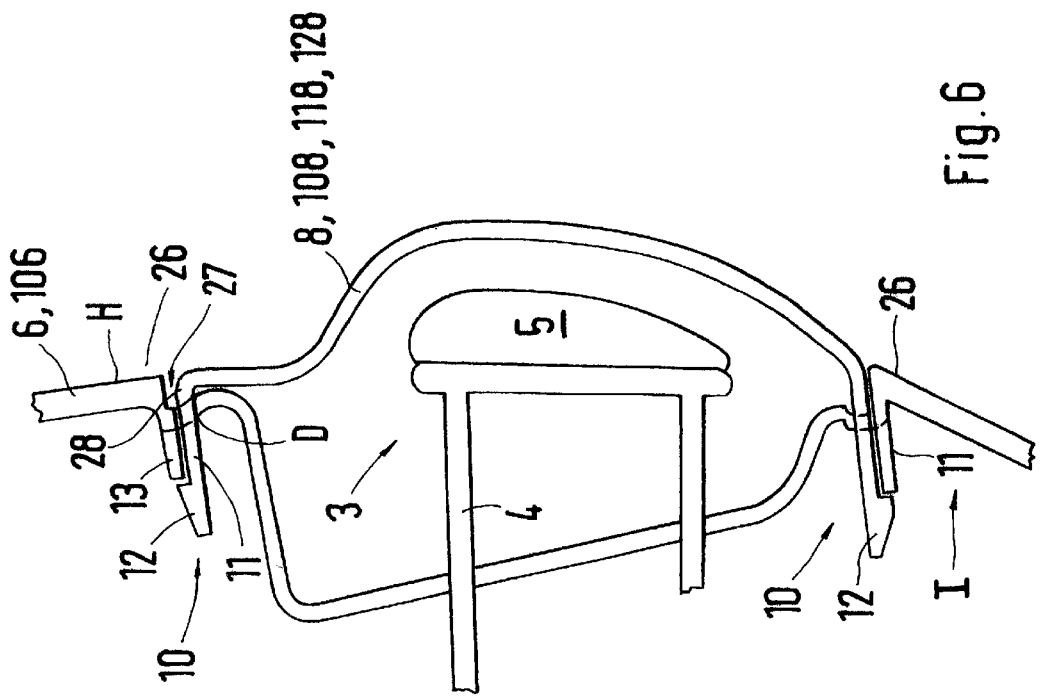
FIG. 6 shows an attachment variant of a covering component on a trim component of a bumper system.

FIG. 6 shows still another attachment variant of covering component 8, 108, 118, or 128 wherein retaining frame 14 can be eliminated. The covering component preferably has several lobes 11 with latching noses 12. For clip connection 10, latching projections 13 are arranged on the inner side I of trim component 6, 106, which can each be engaged from behind by one of the latching noses 12.

To make possible the smooth transition between outer surface A of the trim component and the outer surface of covering component 8, 108, 118, or 128, a groove 27, which surrounds opening 7, 107 (FIG. 2), can be introduced in edge area 26 surrounding opening 7, 107. A surrounding collar 28 that is arranged bent off on covering component 8, 108, 118, or 128, from which the lobes preferably protrude, comes to rest in this groove, whereas openings D, which are penetrated by the lobes 10, are situated at the bottom of the groove 27. A latching projection 13 can be situated behind each opening D.

FIG. 4 shows in partial section support element 4 of impact horn 3. On its end facing toward bumper support 2, support element 4 widens like a fork and engages partially around cross section Q of bumper support 2. In the area of the open end of the fork-shaped enlargement 22 are provided openings 23 that are flush with openings 24 arranged in bumper support 2 to form an attachment. An attachment element 25, in particular a screw or a rivet, engages through openings 23 and 24, and in this way holds impact horn 3 fixedly on bumper support 2.

Another exemplary embodiment of a bumper system is described with reference to FIGS. 1 and 2: covering component 118, 128 can also be attached without problems on trim component 6, provided that retaining openings 29 are provided on trim component 6 for lobes 11 situated in the area of identification field 18. Latching nose 12 configured on each lobe thereby engages behind the interior edge area of corresponding retaining opening 29. A latching projection 13 can be situated behind each retaining opening 29.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A bumper system for a vehicle, comprising a bumper support and a trim component, wherein the bumper support has an attachment for at least one impact horn projecting past an outer surface of the trim component, and the trim component has at least one opening for the impact horn, and wherein a covering component can be inserted into the opening.

2. A bumper system according to claim 1, wherein the opening is configured approximately in a center of the trim component and has an opening width, so that two of said at least one impact horn spaced a certain distance from each other and attached on the bumper support can pass through the opening.

3. A bumper system according to claim 1, wherein two of said at least one opening spaced a certain distance from each other are provided on the trim component.

4. A bumper system according to claim 1, wherein an identification field lies between two of said at least one impact horn.

5. A bumper system according to claim 2, wherein an identification field lies between the impact horns.

6. A bumper system according to claim 3, wherein an identification field lies between two of said at least one impact horn.

7. A bumper system according to claim 4, wherein the identification field is configured on the covering component.

8. A bumper system according to claim 3, wherein a respective one of said covering component is provided for each of the openings.

9. A bumper system according to claim 1, wherein the covering component ends approximately flush with the trim component and is adapted to a shape of an outer contour of the trim component.

10. A bumper system according to claim 2, wherein the covering component ends approximately flush with the trim component and is adapted to a shape of an outer contour of the trim component.

11. A bumper system according to claim 3, wherein the covering component ends approximately flush with the trim component and is adapted to a shape of an outer contour of the trim component.

12. A bumper system according to claim 4, wherein the covering component ends approximately flush with the trim component and is adapted to a shape of an outer contour of the trim component.

13. A bumper system according to claim 7, wherein the covering component ends approximately flush with the trim component and is adapted to a shape of an outer contour of the trim component.

14. A bumper system according to claim 8, wherein the covering component ends approximately flush with the trim component and is adapted to a shape of an outer contour of the trim component.

15. A bumper system according to claim 1, wherein the covering component has two trim contours adapted to an impact element of the impact horn.

16. A bumper system according to claim 2, wherein the covering component has two trim contours adapted to an impact element of the impact horns.

17. A bumper system according to claim 3, wherein the covering component has two trim contours adapted to an impact element of the impact horn.

18. A bumper system according to claim 4, wherein the covering component has two trim contours adapted to an impact element of the impact horns.

19. A bumper system according to claim 7, wherein the covering component has two trim contours adapted to an impact element of the impact horns.

20. A bumper system according to claim 8, wherein the covering component has two trim contours adapted to an impact element of the impact horn.

21. A bumper system according to claim 1, wherein the covering component is held by way of a latch or clip connection on the trim component.

22. A bumper system according to claim 2, wherein the covering component is held by way of a latch or clip connection on the trim component.

23. A bumper system according to claim 3, wherein the covering component is held by way of a latch or clip connection on the trim component.

24. A bumper system according to claim 4, wherein the covering component is held by way of a latch or clip connection on the trim component.

25. A bumper system according to claim 15, wherein the covering component is held by way of a latch or clip connection on the trim component.

26. A bumper system according to claim 1, wherein the covering component is fixed on an impact element, and the impact element is attached by way of a clip connection on the trim component.

27. A bumper system according to claim 2, wherein the covering component is fixed on an impact element, and the impact element is attached by way of a clip connection on the trim component.

28. A bumper system according to claim 3, wherein the covering component is fixed on an impact element, and the impact element is attached by way of a clip connection on the trim component.

29. A bumper system according to claim 4, wherein the covering component is fixed on an impact element, and the impact element is attached by way of a clip connection on the trim component.

30. A bumper system according to claim 7, wherein the covering component is fixed on an impact element, and the impact element is attached by way of a clip connection on the trim component.

31. A bumper system according to claim 8, wherein the covering component is fixed on an impact element, and the impact element is attached by way of a clip connection on the trim component.

32. A bumper system according to claim 9, wherein the covering component is fixed on an impact element, and the impact element is attached by way of a clip connection on the trim component.

33. A bumper system according to claim 15, wherein the covering component is fixed on the impact element, and the impact element is attached by way of a clip connection on the trim component.

34. A bumper system according to claim 21, wherein the covering component is fixed on an impact element, and the impact element is attached by way of a clip connection on the trim component.

35. A bumper system according to claim 26, wherein running around the opening is a groove in which a bent-over collar arranged on the covering component comes to rest.

36. A bumper assembly, comprising:
   a bumper support having an attachment adapted for at least one impact horn,
   a trim component having at least one opening adapted for the impact horn, and
   a covering component insertable into the opening.

37. A modular bumper system comprising:
   a bumper support having an attachment adapted for at least one impact horn,
   a trim component having at least one opening adapted for the impact horn projecting past an outer surface of the trim component, and a covering component which is insertable into said opening and configured depending on the impact horn being attached to the bumper support.

38. A method of making a bumper assembly for a vehicle, comprising:

providing a bumper support for the vehicle having an attachment element adapted for an impact horn which operatively projects past an outer surface of the vehicle body, supplying a trim component with an opening adapted to the impact horn according to one design variant of the vehicle, said trim component being adapted to the vehicle regardless of whether the bumper support has the impact horn attached, and arranging a covering component in the opening of the trim component, wherein the covering component, in a case of the impact horn being attached, has an impact horn trim contour adapted to the impact horn.

39. A method of making a bumper assembly for a vehicle, comprising:

providing a bumper support for the vehicle having an attachment element adapted for an impact horn which operatively projects past an outer surface of a vehicle body, supplying a trim component with an opening adapted to the impact horn according to one design variant of the vehicle, said trim component being adaptable to the vehicle regardless of whether the bumper support has the impact horn attached, and selecting a covering component for the opening of the trim component depending on whether the impact horn is attached.

40. A covering for a trim component of a vehicle which has a bumper support with an attachment adapted for at least one impact horn which is capable of projecting past an outer surface of the trim component, the trim component having at least one opening for the impact horn, wherein the covering component can be inserted into said opening.

41. A method of making a bumper system for a vehicle, comprising:

providing a bumper support having an attachment adapted for at least one impact horn, arranging a trim component having at least one opening adapted for the impact horn projecting past an outer surface of the trim component on the vehicle, and inserting a covering component into the opening.

* * * * *